(12) United States Patent
May et al.

(10) Patent No.: US 7,609,204 B2
(45) Date of Patent: Oct. 27, 2009

(54) SYSTEM AND METHOD FOR DYNAMICALLY ESTIMATING OUTPUT VARIANCES FOR CARRIER-SMOOTHING FILTERS

(75) Inventors: Reed R. May, Seminole, FL (US); Kenneth S. Morgan, St. Petersburg, FL (US)

(73) Assignee: Honeywell International Inc., Morristown, NJ (US)

( * ) Notice: Subject to any disclaimer, the term of this patent is extended or adjusted under 35 U.S.C. 154(b) by 416 days.

(21) Appl. No.: 11/215,169

(22) Filed: Aug. 30, 2005

(65) Prior Publication Data
US 2007/0046535 A1 Mar. 1, 2007

(51) Int. Cl.
*G01S 1/00* (2006.01)
(52) U.S. Cl. .................................. 342/357.12
(58) Field of Classification Search ........................ 342/357.01–357.17; 701/200–226; 330/149, 330/107, 103
See application file for complete search history.

(56) References Cited

U.S. PATENT DOCUMENTS 3,137,459 A * 6/1964 Smith et al. .................. 244/192

(Continued)

FOREIGN PATENT DOCUMENTS

EP 0 694 791 A1 1/1996

(Continued)

OTHER PUBLICATIONS

TAES-200401167-H.K.Lee and C.Rizos, Position-Domain Hatch Filter For Kinematic Differential GPS/GNSS.*

(Continued)

*Primary Examiner*—Thomas H Tarcza
*Assistant Examiner*—Nga X Nguyen
(74) *Attorney, Agent, or Firm*—Fogg & Powers LLC

(57) ABSTRACT

An improved system and method is disclosed for dynamically estimating the output variances of carrier-smoothing filters used, for example, in GPS receivers. By accurately estimating the output variances of the carrier-smoothing filters as they transition from initialization to steady-state operation, it is possible to calculate any required protection levels without having to wait for the filters to fully stabilize. As one example, a system for estimating output variances of a carrier-smoothing filter for use in a satellite navigation system receiver is disclosed, which includes a plurality of smoothing filters associated with a navigation processing unit in a satellite navigation receiver. One or more processors associated with the navigation processing unit executes an algorithm for each smoothing filter, which provides a method for dynamically calculating an output variance for a respective smoothing filter as it transitions in response to new input variance values. The method also predicts the settling point of the output variance for that smoothing filter given a set of pseudorange and carrier-phase values to be applied. Therefore, using this novel output variance prediction method, precision navigation applications such as, for example, airborne GPS-based precision landing system applications can begin operations with suitable calculated protection level values without having to wait for the smoothing filters to stabilize. Thus, such precision landing systems are available for use as soon as the required protection level values are reached.

20 Claims, 3 Drawing Sheets

U.S. PATENT DOCUMENTS

| | | | |
|---|---|---|---|
| 3,603,994 A | 9/1971 | Williams et al. | |
| 3,975,731 A | 8/1976 | Latham et al. | |
| 4,578,678 A * | 3/1986 | Hurd | 342/357.12 |
| 4,737,794 A | 4/1988 | Jones | |
| 4,807,256 A * | 2/1989 | Holmes et al. | 375/344 |
| 5,018,218 A * | 5/1991 | Peregrim et al. | 382/103 |
| 5,296,861 A | 3/1994 | Knight | |
| 5,323,322 A | 6/1994 | Mueller et al. | |
| 5,343,212 A | 8/1994 | Rose et al. | |
| 5,450,448 A | 9/1995 | Sheynblat | |
| 5,459,473 A | 10/1995 | Dempster et al. | |
| 5,471,217 A * | 11/1995 | Hatch et al. | 342/357.02 |
| 5,563,917 A * | 10/1996 | Sheynblat | 375/346 |
| 5,594,453 A | 1/1997 | Rodal et al. | |
| 5,629,708 A | 5/1997 | Rodal et al. | |
| 5,740,048 A * | 4/1998 | Abel et al. | 701/200 |
| 5,751,777 A * | 5/1998 | Zampetti | 375/376 |
| 5,774,387 A * | 6/1998 | Marshall | 708/300 |
| 5,774,829 A | 6/1998 | Cisneros et al. | |
| 5,796,773 A * | 8/1998 | Sheynblat | 342/357.01 |
| 5,825,326 A | 10/1998 | Semler et al. | |
| 5,828,336 A | 10/1998 | Yunck et al. | |
| 5,831,575 A | 11/1998 | Gu | |
| 5,883,595 A * | 3/1999 | Colley | 342/357.12 |
| 5,937,349 A * | 8/1999 | Andresen | 455/431 |
| 5,993,110 A | 11/1999 | Bueno | |
| 6,052,082 A | 4/2000 | Hassan et al. | |
| 6,163,754 A * | 12/2000 | Zhang et al. | 701/215 |
| 6,195,040 B1 * | 2/2001 | Arethens | 342/357.12 |
| 6,198,430 B1 * | 3/2001 | Hwang et al. | 342/357.03 |
| 6,204,808 B1 | 3/2001 | Bloebaum et al. | |
| 6,266,009 B1 * | 7/2001 | Hwang | 342/357.12 |
| 6,311,127 B1 * | 10/2001 | Stratton et al. | 701/213 |
| 6,311,129 B1 | 10/2001 | Lin | |
| 6,329,946 B1 | 12/2001 | Hirata et al. | |
| 6,345,232 B1 * | 2/2002 | Lynch et al. | 701/214 |
| 6,760,663 B2 | 7/2004 | Brenner | |
| 6,778,136 B2 | 8/2004 | Gronemeyer | |
| 6,804,313 B2 * | 10/2004 | Skafidas et al. | 375/350 |
| 6,832,155 B2 | 12/2004 | Draganov | |
| 6,944,541 B2 * | 9/2005 | Pasturel et al. | 701/214 |
| 7,117,417 B2 * | 10/2006 | Sharpe et al. | 714/746 |
| 7,139,354 B2 * | 11/2006 | Izumi et al. | 376/255 |
| 7,151,405 B2 * | 12/2006 | Nezami | 330/149 |
| 2001/0020214 A1 * | 9/2001 | Brenner | 701/213 |
| 2002/0147544 A1 | 10/2002 | Nicosia et al. | |
| 2003/0052817 A1 * | 3/2003 | Diggelen | 342/357.09 |
| 2003/0187575 A1 | 10/2003 | King et al. | |
| 2004/0093130 A1 | 5/2004 | Osder et al. | |
| 2004/0135721 A1 * | 7/2004 | Hoven et al. | 342/357.02 |
| 2004/0225438 A1 * | 11/2004 | Draganov | 701/213 |
| 2005/0135700 A1 * | 6/2005 | Anderson | 382/261 |
| 2005/0203702 A1 * | 9/2005 | Sharpe et al. | 701/213 |
| 2005/0212696 A1 * | 9/2005 | Bartone et al. | 342/357.02 |
| 2006/0047413 A1 * | 3/2006 | Lopez et al. | 701/200 |

FOREIGN PATENT DOCUMENTS

| | | |
|---|---|---|
| GB | 1057583 | 2/1967 |
| GB | 1 554 751 | 10/1979 |
| GB | 2 208 631 A | 4/1989 |
| GB | 2 211 041 A | 6/1989 |
| WO | WO 03-081977 | 10/2003 |

OTHER PUBLICATIONS

Lee, H.K, Position-Domain Hatch Filter For Kinematic Differential GPA/GNSS, Apr. 2, 2004, TAES-200401167.*

Lee, H.K, "Position-Domain Hatch Filter For Kinematic Differential GPS/GNSS", TAES-200401167.*

McGraw et al., "Development of the LAAS Accuracy Models," ION GPS 2000, Sep. 19-22, 2000, Salt Lake City, UT, pp. 1212-1223.

Sayim et al., "Experimental and Theoretical Results on the LAAS Sigma Overbound," ION GPS 2002, Sep. 24-27, 2002, Portland, OR, pp. 29-38.

Shively et al., "Impact of Carrier Smoothing on Event Probabilities in LAAS," ION 58th Annual Meeting/CIGTF 21st Guidance Test Symposium, Jun. 24-26, 2002, Albuquerque, NM, pp. 195-205.

Brenner, "Integrated GPS LAAS/Inertial Guidance System Using Multiple Kalman Filters," Honeywell, 10 pages.

"Minimum Aviation System Performance Standards for the Local Area Augmentation System (LAAS)," RTCA, Inc., 1998.

"GNSS-Based Precision Approach Local Area Augmentation System (LAAS) Signal-in-Space Interface Control Document (ICD)," RTCA, Inc., Nov. 28, 2001.

"Minimum Operational Performance Standards for GPS Local Area Augmentation System Airborne Equipment," RTCA, Inc., Nov. 28, 2001.

Swider R. et al., "Recent developments in the LAAS program GPS", Position Location and Navigation Symposium, IEEE 1998, Palm Springs, CA USA, Apr. 20-23, 1998, New York, NY, USAA, IEEE, US, Apr. 20, 1998, pp. 441-470, XP010276866, ISBN: 978-0-7803-4330-6.

Enge P., "Local Area Augmentation of GPS for the Precision Approach of Aircraft", Proc IEEE, vol. 87, No. 1, vol. 87, No. 1, Jan. 1, 1999, XP011044139, ISSN: 0018-9219.

* cited by examiner

SYSTEM AND METHOD FOR DYNAMICALLY ESTIMATING OUTPUT VARIANCES FOR CARRIER-SMOOTHING FILTERS

FIELD OF THE INVENTION

The present invention relates generally to the field of navigation and guidance systems, and more specifically, but not exclusively, to a system and method for dynamically estimating output variances for carrier-smoothing filters used, for example, in global positioning system-based navigation or guidance systems or similar types of navigation or guidance systems.

BACKGROUND OF THE INVENTION

Satellite-based navigation and guidance systems are known. For example, the Global Positioning System (GPS) is a satellite navigation system used for determining one's precise location, by estimating the three-dimensional, global position of a radio receiver. The receiver, which can be hand-held or mounted to a vehicle such as an aircraft, receives coded signals from a number of earth-orbiting satellite transmitters. Each received signal indicates the position of its satellite transmitter and its transmission time, which enables the receiver (using an internal clock) to approximate signal transit times and estimate the distances to the transmitters. These distances are referred to as "pseudoranges." In practice, a processor associated with the receiver uses at least four of these pseudoranges to estimate the position (e.g., latitude, longitude and altitude) of the receiver and the associated vehicle with a technique known as trilateration. The accuracy of these position solutions depends on certain factors such as, for example, atmospheric conditions and the performance of the individual satellite transmitters. A satellite navigation system similar to the GPS is the Russian-operated Global Navigation Satellite System (GLONASS).

In recent years, the GPS has been extended for use with aircraft during the more critical portions of a flight (e.g., landings). These satellite-based precision landing systems are ground-augmented, differential systems that typically include two-to-four ground-based GPS receivers, a ground-based differential correction processor (DCP), and a correction-data transmitter. These components are located near the aircraft landing areas involved. The ground-based GPS receivers determine sets of pseudoranges based on signals received from at least four satellite transmitters. These pseudorange measurements are forwarded to the ground-based DCP, which uses the pseudoranges and known positions of the ground receivers to produce an error correction factor. The correction-data transmitter transmits the error correction factor to approaching aircraft, which use this correction data to increase the accuracy of the position estimates provided by onboard GPS receivers. A civilian version of such a satellite-based precision landing system is the GPS-based Local Area Augmentation System (LAAS), and a military version is the Joint Precision Approach and Landing System (JPALS).

Essentially, GPS receivers perform two types of measurements. One such measurement is code-based, whereby the receiver tracks the code modulation of the GPS signal to determine the pseudorange. The other measurement is carrier-based, whereby the receiver tracks the carrier phase of the GPS signal. Notably, phase measurements of the carrier signal typically have much less noise than code-based measurements. Consequently, a carrier phase smoothing process has been developed for use in GPS receivers, which combines the code-based pseudorange measurements with the integral of the carrier phase measurements in order to mitigate the noise inherent in the code-based pseudorange tracking process. Essentially, carrier-smoothing is used in GPS receivers for certain precision applications (e.g., LAAS, JPALS, etc.) in order to eliminate as much high frequency noise as possible from the pseudorange measurements involved.

GPS receivers track the code-modulated signals using delay lock loops (DLLs), and the carrier phase signals are tracked with phase lock loops (PLLs). Carrier-smoothing of the code-based pseudorange measurements is typically performed by coupling data from the carrier phase tracking loops to the code-based tracking portion of the system. Typically, each pseudorange value from the receiver is smoothed with its own smoothing filter. Notably, the Hatch filter is a known smoothing filter that is used in GPS receivers for smoothing code-based pseudorange measurements with continuous carrier phase data.

A significant problem with existing carrier-smoothing filters used in airborne GPS-based precision landing systems (e.g., LAAS, JPALS, etc.) and similar precision applications is that the filters can take up to 5 minutes to stabilize. Consequently, carrier-smoothing of the code-based pseudorange measurements in existing GPS receivers is not available for precision applications until after the smoothing filters stabilize. Thus, for precision position determination applications, the existing GPS receivers are performance limited and essentially unavailable for use for a significant period of time after the smoothing filters are initialized. Note that the period of unavailability is associated with the time constant of the smoothing filter. This association drives designers to use shorter time constants, which degrades the smoothing. Consequently, there is a need for a technique that allows the use of potentially longer time constants without meaningfully degrading availability. Therefore, given the substantive, continuing need to improve the precision and performance of airborne landing systems and similar precision position determination applications, it would be advantageous to provide a system and method that enables an airborne GPS-based precision landing system or similar precision application to begin operating with appropriate performance parameters without having to wait for the carrier-smoothing filters in the GPS receivers to stabilize. As described in detail below, the present invention provides such a system and method.

SUMMARY OF THE INVENTION

The present invention provides an improved system and method for dynamically estimating the output variances of carrier-smoothing filters used, for example, in GPS receivers. By accurately estimating the output variances of the carrier-smoothing filters as they transition from initialization to steady-state operation, it is possible to calculate any required protection levels without having to wait for the filters to fully stabilize. In accordance with a preferred embodiment of the present invention, a system for estimating output variances of a carrier-smoothing filter for use in a satellite navigation system receiver is provided, which includes a plurality of smoothing filters associated with a navigation processing unit in a satellite navigation receiver. One or more processors associated with the navigation processing unit executes an algorithm for each smoothing filter, which provides a method for dynamically calculating an output variance for a respective smoothing filter as it transitions in response to new input variance values. The method also predicts the settling point of the output variance for that smoothing filter given a set of pseudorange and carrier-phase values to be applied. Therefore, using the novel output variance prediction method of the present invention, precision navigation applications such as, for example, airborne GPS-based precision landing system applications can begin operations with suitable calculated protection level values without having to wait for the smoothing filters to stabilize. Thus, in accordance with the present invention, such precision landing systems are available for use as soon as the required protection level values are reached.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
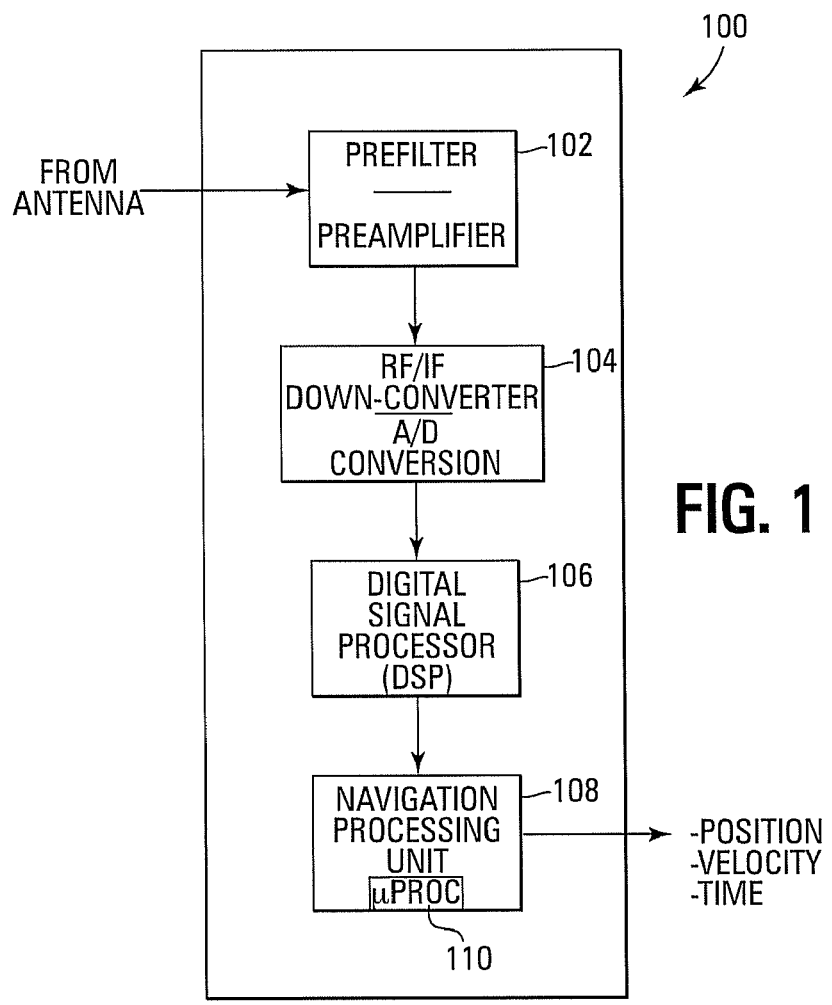
FIG. 1 depicts a simplified block diagram of an example satellite navigation system receiver, which can be used to implement a preferred embodiment of the present invention.

With reference now to the figures, FIG. 1 depicts a simplified block diagram of an example satellite navigation system receiver 100, which can be used to implement a preferred embodiment of the present invention. For example, in one embodiment, receiver 100 can be a GPS receiver for a GPS-based LAAS or JPALS. In another embodiment, receiver 100 can be an embedded 5-channel receiver for an Embedded GPS/Inertial Navigation System (EGI) such as, for example, an H-764 Advanced Configurable EGI (ACE) produced by Honeywell International Inc. In any event, it should be understood that the present invention is not intended to be limited only to GPS receiver applications, and can include within its scope any suitable application where a smoothing filter is used to eliminate high frequency noise.

For this example embodiment, receiver 100 includes a passive band-pass pre-filter and preamplifier unit 102, which filters and preamplifies the Radio Frequency (RF) signals received from a plurality of satellite transmitters. The preamplified RF signals are coupled to a down-converter and analog-to-digital (A/D) conversion unit 104, which converts the RF signals to an Intermediate Frequency (IF) and then converts these analog signals to digital form. Typically, these digital signals are coupled to a Digital Signal Processor (DSP) 106, which performs suitable digital signal processing to enhance the digital data received. For this example embodiment, the digital data is coupled from DSP 106 to a navigation processing unit 108, which executes suitable algorithms (e.g., implemented in software) to generate position, velocity and time information. As such, one or more microprocessors 110 (e.g., implemented with one or more Power PC-based microprocessors) can be used in association with navigation processing unit 108 and/or DSP 106, in order to execute suitable algorithms (e.g., implemented in software) that perform carrier phase smoothing of the code-based pseudorange measurement data generated in receiver 100, and dynamically estimates the output variances of carrier-smoothing filters used, in accordance with teachings of the present invention.

Figure 2:
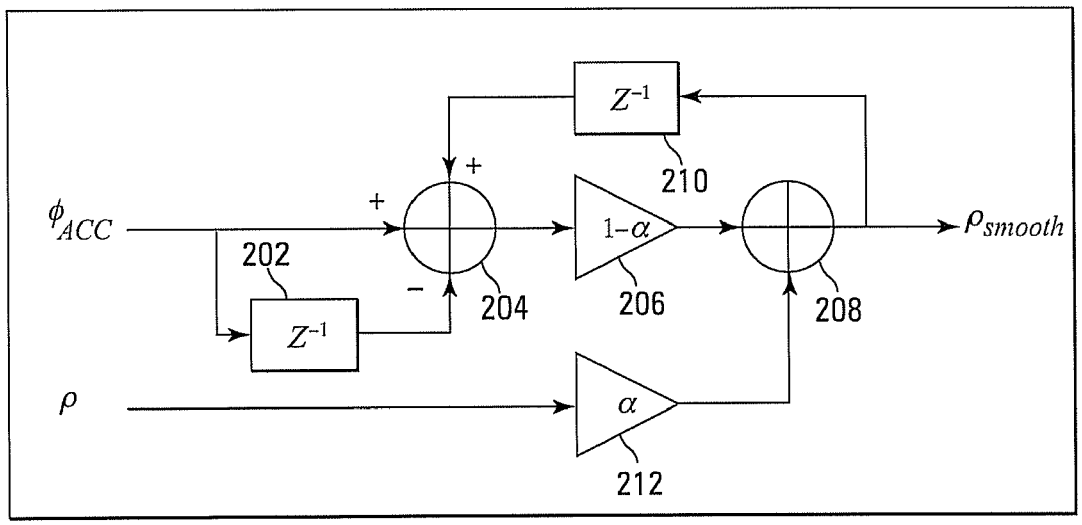
FIG. 2 depicts a simplified block diagram of an example smoothing filter, which can be used to implement a preferred embodiment of the present invention.

FIG. 2 depicts a simplified block diagram of an example smoothing filter 200, which can be used to implement a preferred embodiment of the present invention. For example, smoothing filter 200 can represent one filter of a plurality of Hatch-type smoothing filters that can be used for carrier phased smoothing of a plurality of code-based pseudorange signals (e.g., from receiver 100 in FIG. 1). Essentially, for this example embodiment, using dual-frequency carrier phases (e.g., L1 and L2), each available pseudorange value received (e.g., from receiver 100) can be smoothed with a respective smoothing filter 200. Thus, for this example, smoothing filter 200 accepts two inputs: the accumulated carrier phase value ($\phi_{ACC}$); and a new code-based pseudorange value ($\rho$). For each input code-based pseudorange value ($\rho$), smoothing filter 200 produces at its output a new, smoothed pseudorange value ($\rho_{smooth}$) by combining a projected pseudorange value based on the accumulated phase data, with the current code-based pseudorange value.

For this example embodiment, smoothing filter 200 is implemented as an algorithm (e.g., software executed by microprocessor 110 in FIG. 1), which includes two one-sample delays 202, 210, two adders 204, 208, and two amplifiers 206, 212. As such, FIG. 2 illustrates a Hatch filter implementation of a smoothing filter, whereby accumulated carrier phase ($\phi_{ACC}$) is back-differenced to produce a (low-noise) delta-range value which is then added to the last smoothed output value ($\rho_{smooth}$) to form a predicted pseudorange value (204). This low-noise prediction is combined (208) with the raw pseudorange value in a proportion defined by the value of $\alpha$ (206, 212). For example, $\alpha$ is typically a value of 0.01 for 1-second updates, which makes the output ($\rho_{smooth}$) 99% "smooth prediction" and 1% raw pseudorange.

Figure 3:
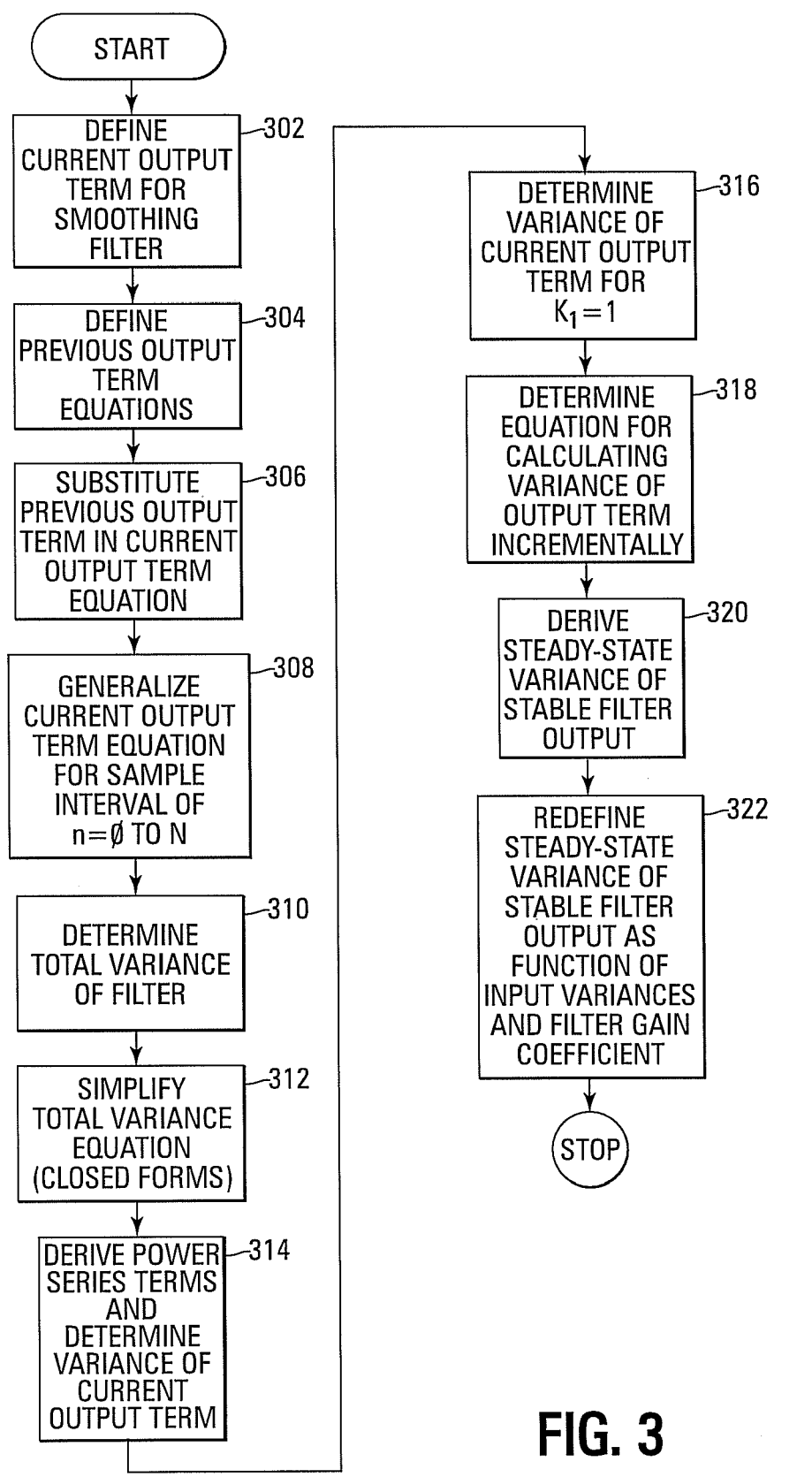
FIG. 3 depicts a flow chart showing an exemplary method for dynamically estimating output variances for a smoothing filter, in accordance with a preferred embodiment of the present invention.

FIG. 3 depicts a flow chart showing an exemplary method 300 for dynamically estimating output variances for a smoothing filter, which can be used, for example, with filter 200 shown in FIG. 2 in accordance with a preferred embodiment of the present invention. An example of computer code that can be used to implement method 300 in software is incorporated as Appendix I. Essentially, in accordance with the present invention, method 300 initializes the smoothing filter, then the variance equation is initialized, and for each input set ($\phi_{ACC}, \rho$), from navigation system receiver 100, filter 200 is executed and using the new set of the variances of $\rho, \phi_{ACC}$ from navigation system receiver 100, method 300 iterates the variance equation.

Specifically, referring now to FIGS. 2 and 3, for this example embodiment, the filter gain ($\alpha$) value for smoothing filter 200 is defined as:

$$\alpha = \frac{ts}{100 \sec} \quad (1)$$

where ts is the sample interval, and 100 seconds is a predetermined, fixed time constant value. Thus, assuming that a sampling interval into filter 200 is 1.0 second, a variance reduction ratio for filter 200 is 0.005025 for the raw pseudorange input ($\rho$) and 0.985025 for the accumulated phase input ($\phi_{ACC}$). These variance reduction ratio values were obtained using a MATLAB simulation by summing the impulse response of each filter channel used. Thus, the steady-state variance for filter 200 may be represented as:

$$\sigma_{stable}^2 = (0.005025)\sigma_\rho^2 + (0.985025)\sigma_\phi^2 \quad (2)$$

For this example embodiment, a closed-form solution for the transient variance of smoothing filter 200 may be derived in terms of the input signal variances and the filter coefficient/ sampling interval as the filter settles down (stabilizes) from initialization to steady state. The resulting equation for that closed-form solution can be used to validate the values shown above in equation (2). As such, at step 302 of the method, filter 200 may be represented as:

$$S_n = \alpha\rho_n + \beta(\phi_n - \phi_{n-1} + S_{n-1}) \quad (3)$$

where $S_n$=the current output term, $S_{n-1}$=the previous output term (prior sample time), $\rho_n$=the current pseudorange input value, $\phi_n$=the current accumulated carrier phase input value, $\phi_{n-1}$=the previous accumulated carrier phase input value, $\alpha$=the filter gain as defined above in equation (1), and $\beta$ is defined as $1-\alpha$ (to simplify terms in the derivation to follow). Next, at step 304, the output terms $S_{n-1}$, $S_{n-2}$, may be defined as:

$$S_{n-1} = \alpha\rho_{n-1} + \beta(\phi_{n-1} - \phi_{n-2} + S_{n-2})$$

$$S_{n-2} = \alpha\rho_{n-2} + \beta(\phi_{n-2} - \phi_{n-3} + S_{n-3}) \quad (4)$$

At step 306, these terms are then substituted into the filter equation (3):

$$S_n = \alpha\rho_n + \beta\alpha\rho_{n-1} + \beta^2\alpha\rho_{n-2} + \beta\phi_n + (\beta^2-\beta)\phi_{n-1} + (\beta^3-\beta^2)\phi_{n-2} - \beta^3\phi_{n-3} + \beta^3 S_{n-3} \quad (5)$$

At step 308, by inspection, equation (5) can be generalized for a sample interval of n=0 to N:

$$S_n = \alpha(\rho_n + \beta\rho_{n-1} + \beta^2\rho_{n-2} + \ldots + \beta^N\rho_0) + \beta(\phi_n + (\beta-1)\phi_{n-1} + (\beta^2-\beta)\phi_{n-2} + \ldots + (\beta^N - \beta^{N-1})\phi_0) + \beta^N S_0 \quad (6)$$

where $S_0$=the initial value of the fed-back output term (initialized to $\rho_0$), $\rho_0$=the initial pseudorange value, and $\phi_0$=the initial accumulated phase input value. Assuming that the input processes are stationary (e.g., $\sigma_\phi^2$ and $\sigma_\rho^2$ do not change during the sample interval n=0 to N), then equation (6) can be factored again, and at step 310, a generalized equation for the total variance of the filter is:

$$\sigma_{S_n}^2 = \alpha^2\sigma_\rho^2(1+\beta^2+\beta^4+\ldots+\beta^{2N}) + \beta^2\sigma_\phi^2(1+(\beta-1)^2 + (\beta^2-\beta)^2 + \ldots + (\beta^N-\beta^{N-1})^2) + \beta^{2N}\sigma_{S_0}^2 \quad (7)$$

where $\sigma_\rho^2 = \sigma_{\rho_n}^2 = \sigma_{\rho_{n-1}}^2 = \sigma_{\rho_{n-2}}^2 \ldots$=the variance of the pseudorange input, and $\sigma_\phi^2 = \sigma_{\phi_n}^2 = \sigma_{\phi_{n-1}}^2 = \sigma_{\phi_{n-2}}^2 \ldots$=the variance of the accumulated phase input.

At this point, the total variance equation (7) can be simplified by recognizing that the power series terms may be expressed as closed forms (at step 312):

$$\sigma_{S_n}^2 = \alpha^2\sigma_\rho^2 k_1 + \beta^2\sigma_\phi^2 k_2 + \beta^{2n}\sigma_{S_0}^2 \quad (8)$$

The two power series terms can then be reduced to standard forms:

$$k_1 = (1+\beta^2+\beta^4+\ldots+\beta^{2n}) \Rightarrow 1 + \sum_{n=1}^{N}\beta^{2n}$$

By substitution, the value of $k_1$ has a closed solution of $$k_1 = \left[1 + \frac{\beta^2}{(1-\beta^2)}\right].$$

This value can be simplified further by substituting $(1-\alpha)$ for $\beta$ to obtain:

$$k_1 = \left[\frac{1}{\alpha(2-\alpha)}\right].$$

Also, the $k_2$ term can be simplified to $k_2=2\alpha k_1$. At step 314, substituting this new term for $k_2$ into equation (8) above produces:

$$\sigma_{S_n}^2 = \alpha^2\sigma_\rho^2 k_1 + \beta^2\sigma_\phi^2(2\alpha k_1) + \beta^{2n}\sigma_{S_0}^2 \quad (9)$$

The incremental expression for the variance $\sigma_{S_n}^2$ based on $\sigma_{S_{n-1}}^2$ is obtained from equation (9) by considering the case where the values of $\sigma_\phi^2$ and $\sigma_\rho^2$ are constant for only one sample. In this case, the value of $k_1$ is unity, and at step 316, equation (9) becomes:

$$\sigma_{S_n}^2 = \alpha^2\sigma_\rho^2 + 2\alpha\beta^2\sigma_\phi^2 + \beta^2\sigma_{S_{n-1}}^2 \quad (10)$$

As such, the derivation of this equation (10) was originally predicated on the assumption that the variance values are constant over the sample interval. However, in practicality, this assumption is valid for $\sigma_\rho^2$, but it does not hold up for transients in $\sigma_\phi^2$ because the output of the filter has forcing inputs from both $\sigma_{\phi_n}^2$ and $\phi_{n-1}^2$. Thus, equation (10) should have an additional term to account for the step change in the carrier noise variance from one sample to the next. Without such a term, the transient response to changes in the carrier variance may not be correct. Based on the original assumptions, the carrier variance in equation (10) can be corrected by replacing $\sigma_\phi^2$ with $\sigma_{\phi_{n-1}}^2$ to add a new term for the change in the carrier variance from "n-1" to "n", which accounts for an "erroneous" assumption that $\sigma_{\phi_n}^2 = \sigma_{\phi_{n-1}}^2$.

Thus, at step 318, the final equation to be used for calculating $\sigma_{S_n}^2$ incrementally is:

$$\sigma_{S_n}^2 = \alpha^2\sigma_{\rho_n}^2 + 2\alpha\beta^2\sigma_{\phi_{n-1}}^2 + \beta^2\sigma_{S_{n-1}}^2 + \beta^2(\sigma_{\phi_n}^2 - \sigma_{\phi_{n-1}}^2) \quad (11)$$

Notably, equation (11) was thoroughly tested in MATLAB evaluations that produced excellent results across wide variations in filter gain as well as injected transient values of $\sigma_\rho^2$ and $\sigma_\phi^2$. As such, the final steady-state variance of the stable filter (200) can be determined by returning to equation (9) and continuing the derivation by allowing the value of n→∞. At step 320, as n→∞, the initial feedback variance term, $\sigma_{S_0}^2$, goes to zero, and the remaining numeric sequences can be expressed using the closed form of the power series $k_1$ to produce the following equation:

$$\sigma_{S_n}^2 = \alpha^2\sigma_\rho^2\left[\frac{1}{\alpha(2-\alpha)}\right] + \beta^2\sigma_\phi^2 2\alpha\left[\frac{1}{\alpha(2-\alpha)}\right] \quad (12)$$

Consequently, reducing equation (12) slightly, at step 322, the steady-state variance of the output of the smoothing filter 200, defined as a function of the input variances and the filter gain coefficient, becomes:

$$\sigma_{S_\infty}^2 = \left[\frac{\alpha}{(2-\alpha)}\right]\sigma_\rho^2 + \left[\frac{2\beta}{(2-\alpha)}\right]\sigma_\phi^2 \quad (13)$$

Figure 4:
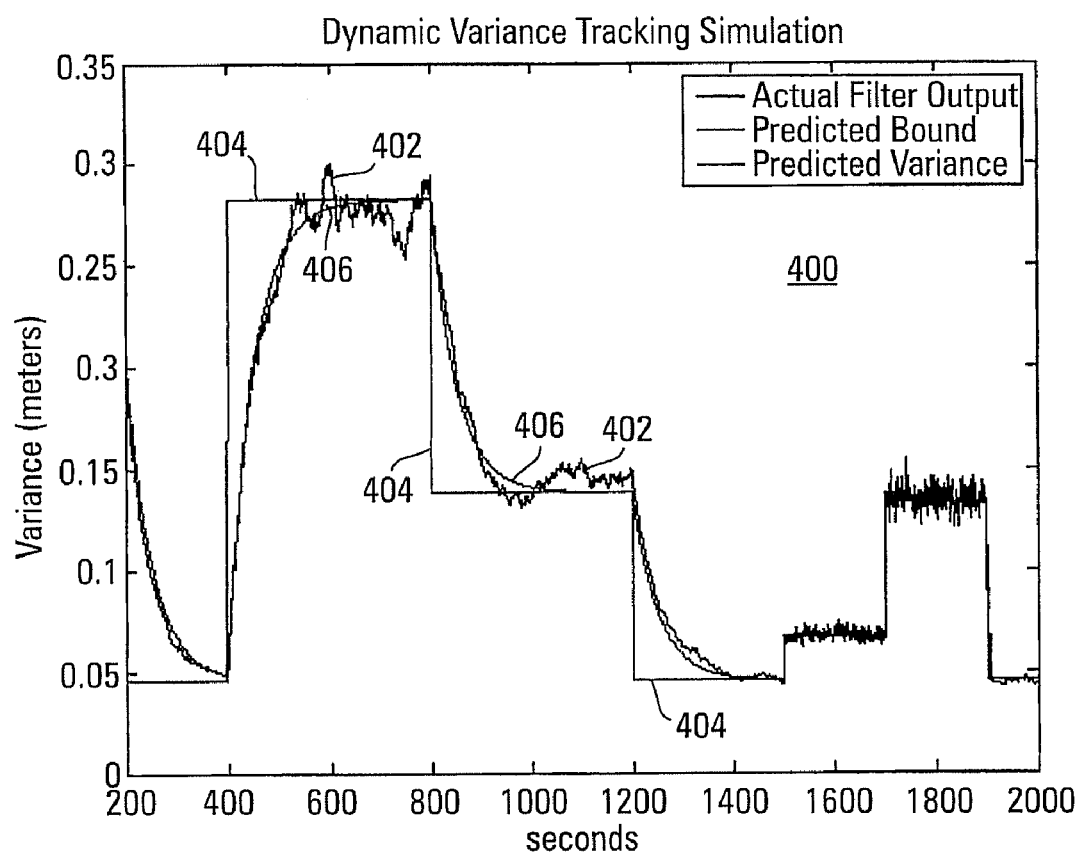
FIG. 4 depicts a graph of the results of an example MATLAB simulation, which illustrates a successful application of the method described with respect to FIG. 3, in accordance with a preferred embodiment of the present invention.

FIG. 4 depicts a graph 400 of the results of an example MATLAB simulation, which illustrates a successful application of method 300 for a smoothing filter (e.g., filter 200), in accordance with a preferred embodiment of the present invention. As such, for this illustrative example, the line designated as 402 shows the actual calculated variance of the output of the filter used, as the code-based pseudorange and carrier-phase variance values are stepped to different values during the filter's operation. The line designated as 404 shows the predicted settling point of the output variance of the filter given the set of pseudorange and carrier-phase variance values being applied (e.g., calculated using equation (12)). The line designated as 406 shows the dynamically calculated (predicted) output variance of the filter as it transitions in response to new variance input values (e.g., calculated using equation (11)).

As such, in accordance with a preferred embodiment of the present invention, a novel method is provided for dynamically calculating an output variance for a smoothing filter as it transitions in response to new input variance values. The method also predicts the settling point of the output variance for that smoothing filter given a set of pseudorange and carrier-phase values to be applied. Therefore, using the novel output variance prediction method of the present invention, precision navigation applications such as, for example, airborne GPS-based precision landing system applications can begin operations with suitable calculated protection level values without having to wait for the smoothing filters to stabilize. Consequently, such precision landing systems are available for use as soon as the required protection level values are reached.

It is important to note that while the present invention has been described in the context of a fully functioning navigation system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular navigation system.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A method for dynamically estimating output variances for a smoothing filter, comprising the steps of:
   receiving a signal at a receiver;
   defining a current output term for the smoothing filter;
   determining a total variance of the smoothing filter;
   determining a variance of said current output term of the smoothing filter;
   incrementally calculating said variance of said current output term of the smoothing filter;
   deriving a steady-state variance for an output of the smoothing filter;
   defining said steady-state variance as a function of a variance of an input pseudorange value ($\rho$) and a variance of an input accumulated carrier phase value ($\emptyset_{ACC}$) of the smoothing filter; and
   filtering the received signal based upon at least the defined steady-state variance.

2. The method of claim 1, further comprising the steps of: redefining said steady-state variance as a function of at least one of a plurality of input variances and a gain coefficient.

3. The method of claim 1, further comprising the step of:
   redefining said current output term with a plurality of previous output terms; and
   generalizing said redefined current output term, by defining said current output term for a sample interval of n=0 to N.

4. The method of claim 1, whereby said steady-state variance for said output of said smoothing filter is defined as a function of a plurality of input variances and a filter gain coefficient, wherein $\alpha$ is a filter gain of the smoothing filter, wherein $\beta$ is $(1-\alpha)$, and wherein the steady-state variance is expressed as $$\sigma_{S\infty}^2 \left[\frac{\alpha}{(2-\alpha)}\right]\sigma_\rho^2 + \left[\frac{2\beta}{(2-\alpha)}\right]\sigma_\phi^2.$$

5. The method of claim 1, wherein said smoothing filter comprises a Hatch filter.

6. The method of claim 1, wherein said smoothing filter comprises a pseudorange smoothing filter for use with a satellite navigation receiver system.

7. A receiver system, comprising:
   a preamplifier unit;
   a down-converter unit, an input of said down-converter unit coupled to an output of said preamplifier unit;
   an analog-to-digital conversion unit, an input of said analog-to-digital conversion unit coupled to an output of said down-converter unit;
   a processing unit, said processing unit coupled to an output of said analog-to-digital conversion unit; and at least one smoothing filter, a plurality of inputs of said at least one smoothing filter coupled to said processing unit, said processing unit operable to:
   define a current output term of said at least one smoothing filter;
   determine a total variance of said at least one smoothing filter;
   determine a variance of said current output term of said at least one smoothing filter;
   incrementally calculate said variance of said current output term of said at least one smoothing filter;
   derive a steady-state variance for an output of said at least one smoothing filter; and
   redefine said steady-state variance as a function of a variance of an input pseudorange value ($\rho$) and a variance of an input accumulated carrier phase value ($\emptyset_{ACC}$) of said at least one smoothing filter.

8. The receiver system of claim 7, wherein said at least one smoothing filter comprises a carrier-phase smoothing filter for pseudoranges.

9. The receiver system of claim 7, further comprising a global positioning system receiver.

10. The receiver system of claim 7, wherein said processing unit is further operable to:
    redefine said steady-state variance as a function of at least one of a plurality of input variances and a gain coefficient.

11. A navigation receiver, comprising:
    means for preamplifying a received signal;
    means for converting a preamplified signal from a radio frequency to an intermediate frequency, said means for converting coupled to an output of said means for preamplifying;
    means for converting an analog signal received from said means for converting to a digital form;

smoothing means; and processing means coupled to said smoothing means, for defining a current output term for said smoothing means, determining a total variance term for said smoothing means, determining a variance of said current output term, of said smoothing means, incrementally calculating said variance of said current output term of said smoothing means, deriving a steady-state variance for an output of the smoothing mean, and redefining said steady-state variance as a function of a variance of an input pseudorange value($\rho$) and a variance of an input accumulated carrier phase value ($\emptyset_{ACC}$) of the smoothing means.

12. The navigation receiver of claim 11, wherein said processing means is further for redefining said steady-state variance as a function of at least one of a plurality of input variances and a gain coefficient.

13. The navigation receiver of claim 11, wherein said smoothing means comprises a carrier-phase smoothing filter for pseudoranges.

14. The navigation receiver of claim 11, further comprising a global positioning system receiver.

15. A computer program product, comprising:

a computer-usable medium having computer-readable code embodied therein for configuring a computer processor, the computer program product comprising:

a first executable computer-readable code configured to cause a computer processor to define a current output term for a smoothing filter;

a second executable computer-readable code configured to cause a computer processor to determine a total variance of said smoothing filter;

a third executable computer-readable code configured to cause a computer processor to determine a variance of said current output term of said smoothing filter;

a fourth executable computer-readable code configured to cause a computer processor to incrementally calculate said variance of said current output term of said smoothing filter;

a fifth executable computer-readable code configured to cause a computer processor To derive a steady-state variance for an output of the smoothing filter; and a sixth executable computer-readable code configured to cause a computer processor to redefine said steady-state variance as a function of a variance of an input pseudorange value ($\rho$) and a variance of an input accumulated carrier phase value ($\emptyset_{ACC}$) of the smoothing filter.

16. The computer program product of claim 15, further comprising:

a seventh executable computer-readable code configured to cause a computer processor to redefine said steady-state variance as a function of at least one of a plurality of input variance and a gain coefficient.

17. The computer program product of claim 15, wherein said smoothing filter comprises a carrier-phase smoothing filter for a plurality of pseudoranges.

18. The computer program product of claim 15, wherein said smoothing filter comprises a smoothing filter for a global positioning system receiver.

19. The computer program product of claim 15, wherein said smoothing filter comprises a Hatch filter.

20. The computer program product of claim 15, wherein said smoothing filter comprises a carrier-phase smoothing filter for a plurality of pseudorange measurements.

* * * * *

UNITED STATES PATENT AND TRADEMARK OFFICE
CERTIFICATE OF CORRECTION

PATENT NO. : 7,609,204 B2  Page 1 of 1
APPLICATION NO. : 11/215169
DATED : October 27, 2009
INVENTOR(S) : May et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 560 days.

Signed and Sealed this

Twelfth Day of October, 2010

David J. Kappos
*Director of the United States Patent and Trademark Office*